(12) United States Patent
Kitahara (10) Patent No.: US 8,040,618 B2
(45) Date of Patent: Oct. 18, 2011

(54) IMAGING LENS AND IMAGING APPARATUS USING IMAGING LENS

(75) Inventor: Yu Kitahara, Saitama (JP)

(73) Assignee: Fujinon Corporation, Saitama (JP)

( * ) Notice: Subject to any disclaimer, the term of this patent is extended or adjusted under 35 U.S.C. 154(b) by 33 days.

(21) Appl. No.: 12/580,729

(22) Filed: Oct. 16, 2009

(65) Prior Publication Data
US 2010/0103538 A1  Apr. 29, 2010

(30) Foreign Application Priority Data
Oct. 28, 2008 (JP) .............................. P2008-276246

(51) Int. Cl.
G02B 13/04 (2006.01)
G02B 9/62 (2006.01)
(52) U.S. Cl. ......... 359/752; 359/753; 359/756; 359/761
(58) Field of Classification Search ........... 359/793, 359/792, 794, 791, 759, 691, 689, 749–753, 359/756, 761
See application file for complete search history.

(56) References Cited

U.S. PATENT DOCUMENTS
5,682,269 A  10/1997 Kimura et al.
2006/0238891 A1*  10/2006 Ogata ........................... 359/690

FOREIGN PATENT DOCUMENTS
JP  3254239 B2  2/2002
JP  3478643 B2  12/2003
JP  3723637 B2  12/2005
JP  3964533 B2  8/2007
* cited by examiner Primary Examiner — Scott J Sugarman
(74) Attorney, Agent, or Firm — Birch, Stewart, Kolasch & Birch, LLP (57) ABSTRACT

An imaging lens includes, in order from an object side, a positive first lens group, a stop, and a positive second lens group. The first lens group includes, in order from the object side, a first lens, which is a negative meniscus lens having a convex object-side surface, and a second lens having a positive power and including a convex image-side surface. The second lens group includes, in order from the object side, a third lens having a negative power and including a concave object-side surface, a fourth lens having a positive power and including a convex image-side surface, a fifth lens, which is a biconvex lens, and a sixth lens, which is a meniscus lens having a negative power and including a convex surface facing an image side. Each of the first to sixth lenses is a single spherical glass lens.

6 Claims, 10 Drawing Sheets

EXAMPLE 1

FIG.3

EXAMPLE 2

FIG.4
EXAMPLE 3

FIG.5
EXAMPLE 4

FIG.6

EXAMPLE 5

FIG.7

EXAMPLE 6

FIG.11A
EXAMPLE 3
Fno. = 2.80
-0.05mm 0.05mm
SPHERICAL ABERRATION
—— e-LINE
----- g-LINE
——- C-LINE

FIG.11B
EXAMPLE 3
$\omega = 28.5°$
-0.05mm 0.05mm
ASTIGMATISM
—— SAGITTAL
····· TANGENTIAL FIG.11C
EXAMPLE 3
$\omega = 28.5°$
-5%  5%
DISTORTION FIG.11D
EXAMPLE 3
$\omega = 28.5°$
-5μm  5μm
LATERAL CHROMATIC ABERRATION
----- g-LINE
——- C-LINE FIG.12A
EXAMPLE 4
Fno. = 4.00
-0.05mm 0.05mm
SPHERICAL ABERRATION
—— e-LINE
----- g-LINE
——- C-LINE FIG.12B
EXAMPLE 4
$\omega = 29.6°$
-0.05mm 0.05mm
ASTIGMATISM
—— SAGITTAL
····· TANGENTIAL FIG.12C
EXAMPLE 4
$\omega = 29.6°$
-5%  5%
DISTORTION FIG.12D
EXAMPLE 4
$\omega = 29.6°$
-5μm  5μm
LATERAL CHROMATIC ABERRATION
----- g-LINE
——- C-LINE

FIG.13A EXAMPLE 5
FIG.13B EXAMPLE 5
FIG.13C EXAMPLE 5
FIG.13D EXAMPLE 5

FIG.14A EXAMPLE 6
FIG.14B EXAMPLE 6
FIG.14C EXAMPLE 6
FIG.14D EXAMPLE 6

FIG.15A

EXAMPLE 7

Fno. = 4.00

-0.05mm  0.05mm
SPHERICAL
ABERRATION
—— e-LINE
----- g-LINE
——— C-LINE

FIG.15B

EXAMPLE 7

ω=29.7°

-0.05mm  0.05mm
ASTIGMATISM

—— SAGITTAL
----- TANGENTIAL

FIG.15C

EXAMPLE 7

ω=29.7°

-5%      5%
DISTORTION

FIG.15D

EXAMPLE 7

ω=29.7°

-5μm     5μm
LATERAL CHROMATIC
ABERRATION
----- g-LINE
——— C-LINE

FIG.16

IMAGING LENS AND IMAGING APPARATUS USING IMAGING LENS

CROSS-REFERENCE TO RELATED APPLICATIONS

This application is based upon and claims the benefit of priority from the Japanese Patent Application No. 2008-276246 filed on Oct. 28, 2008; the entire contents of which are incorporated herein by reference.

BACKGROUND OF THE INVENTION

1. Field of the Invention

The present invention relates to an imaging lens that captures the image of an object, and an imaging apparatus using the imaging lens.

2. Description of the Related Art

An in-vehicle imaging apparatus has been proposed which monitors the front of a vehicle. The imaging apparatus is provided in the vehicle to monitor the deviation of the vehicle from its lane or to monitor traffic signs while the vehicle is traveling. Generally, an imaging lens having a small size and a long back focal length has been used as an in-vehicle imaging lens.

For example, a structure has been proposed in which a cemented lens or a plastic aspheric lens is used as an imaging lens having a small size and a long back focal length (see Japanese Patent Nos. 3254239, 3478643(U.S. Pat. No. 5,682, 269), 3723637, and 3964533).

Japanese Patent Nos. 3254239, 3478643(U.S. Pat. No. 5,682,269), 3723637, and 3964533 disclose imaging lenses using cemented lenses. Japanese Patent No. 3254239 discloses an imaging lens that has a large number of lenses including an aspheric lens having a relatively small angle of view. Japanese Patent No. 3478643(U.S. Pat. No. 5,682,269) discloses an imaging lens using a large number of meniscus lenses. Japanese Patent No. 3723637 discloses an imaging lens having a total length greater than the focal length. Japanese Patent No. 3964533 discloses an imaging lens that has a relatively high F number (Fno=4) and a small angle of view and does not correspond to an increase in diameter.

However, the in-vehicle imaging lens, for example, is provided in the vehicle in severe environments, such as a low-temperature environment of 0° C. or less in a cold region and a high-temperature and high-humidity environment in a tropical region (for example, a temperature of 80° C. and a humidity of 80%). Therefore, a cement of the cemented lens or the plastic lens is made of a material forming the imaging lens is likely to be transformed or deformed, which may cause deterioration of the optical performance of the imaging lens, for example, a reduction in resolution. In addition, the optical performance of the imaging lens may be lowered due to a variation in the shape or refractive index of the imaging lens caused by a change in the temperature of the imaging lens while capturing the image of an object.

Therefore, it is necessary to prevent the optical performance of the imaging lens from being lowered due to the transformation or deformation of each lens, or the variation in the refractive index of each lens when the imaging lens is provided in a severe environment.

The problem of the deterioration of the optical performance of the imaging lens is not limited to the in-vehicle imaging lens, but it also arises in an imaging lens including a plastic lens or a cemented lens.

SUMMARY OF THE INVENTION

The invention has been made in order to solve the above-mentioned problems, and an object of the invention is to provide an imaging lens having a small size, a long back focal length, and high environmental resistance and an imaging apparatus using the imaging lens.

According to an aspect of the invention, an imaging lens includes a first lens group having a positive power, a stop, and a second lens group having a positive power. The first lens group, the stop, and the second lens group are arranged in this order from an object side. The first lens group includes a first lens and a second lens. The first lens is a meniscus lens having a negative power and including a convex surface facing the object side. The second lens has a positive power and includes a convex image-side surface. The second lens group includes, in order from the object side, a third lens, a fourth lens, a fifth lens and a sixth lens. The third lens has a negative power and includes a concave object-side surface. The fourth lens has a positive power and includes a convex image-side surface. The fifth lens is a biconvex lens. The sixth lens is a meniscus lens having a negative power and including a convex surface facing an image side. Each of the first to sixth lenses is a single spherical glass lens.

The imaging lens may satisfy Conditional expression 1 given below:

$1.1 < f36/f < 1.7$  [Conditional expression 1]

(where f indicates a focal length of an entire imaging lens system, and f36 indicates a focal length of the second lens group).

It is more preferable that the imaging lens satisfies Conditional expression 1' given below:

$1.2 < f36/f < 1.6.$  [Conditional expression 1']

The imaging lens may satisfy Conditional expression 2 given below:

$-1.4 < f1/f2 < -0.7$  [Conditional expression 2]

(where f1 indicates a focal length of the first lens and f2 indicates a focal length of the second lens).

It is more preferable that the imaging lens satisfies Conditional expression 2' given below:

$-1.3 < f1/f2 < -0.8.$  [Conditional expression 2']

The imaging lens may satisfy Conditional expression 3 given below:

$1.1 < R11/R12 < 2.0$  [Conditional expression 3]

(where R11 indicates a curvature radius of an image-side surface of the fifth lens, and R12 indicates a curvature radius of an object-side surface of the sixth lens).

It is more preferable that the imaging lens satisfy Conditional expression 3' given below:

$1.2 < R11/R12 < 1.9.$  [Conditional expression 3']

The imaging lens may satisfy Conditional expression 4 given below:

$vd3 < 20$  [Conditional expression 4]

(where vd3 indicates the Abbe number of the third lens at the d-line).

According to another aspect of the invention, an imaging apparatus includes the imaging lens according to the above-mentioned aspect and an imaging device that converts an optical image formed by the imaging lens into an electric signal.

The single spherical glass lens means a single lens that is made of only a glass material and includes a spherical object-side surface and a spherical image-side surface.

According to the imaging lens and the imaging apparatus using the image lens of the above-mentioned aspects, the imaging lens includes a first lens group having a positive power, an aperture diaphragm, and a second lens group having a positive power arranged in this order from an object side. The first lens group includes a first lens, which is a meniscus lens that has a negative power and includes a convex surface facing the object side, and a second lens that has a positive power and includes a convex image-side surface arranged in this order from the object side. The second lens group includes a third lens that has a negative power and includes a concave object-side surface, a fourth lens that has a positive power and includes a convex image-side surface, a fifth lens, which is a biconvex lens, and a sixth lens, which is a meniscus lens that has a negative power and includes a convex surface facing an image side, arranged in this order from the object side. Each of the first to sixth lenses of the imaging lens is a single spherical glass lens. Therefore, it is possible to obtain an imaging lens having a small size, a long back focal length and high environmental resistance.

That is, both the lens closest to the object side in the first lens group and the lens closest to the object side in the second lens group have negative powers. Therefore, it is possible to increase the back focal length to be greater than the length of the entire imaging lens system.

The back focal length is an air equivalent distance from the lens surface closest to the image side among the lens surfaces of the imaging lens to the imaging surface of the imaging lens.

The lens closest to the object side in the entire imaging lens system is a meniscus lens that has a negative power and includes a convex surface facing the object side, and the lens closest to the image side in the entire imaging lens system is a meniscus lens that has a negative power and includes a convex surface facing the image side. Therefore, it is possible to reduce the size of the imaging lens and prevent the occurrence of field curvature or distortion.

The cement of the cemented lens or the plastic lens is made of a material, such as a polymer material, having a melting point lower than that of a glass material. The low-melting-point material is more likely to be deformed by the influence of the temperature or humidity than the glass material, and the optical characteristics thereof, such as the refractive index, are also more likely to be changed. In addition, the low-melting-point material is more likely to be transformed than the glass material. Therefore, when the imaging lens is used for a long time, the optical performance of the imaging lens is lowered.

According to the above-mentioned aspects of the invention, the imaging lens is not made of the low-melting-point material, but is made of only a glass member having high environmental resistance. Therefore, it is possible to obtain an imaging lens and an imaging apparatus having high environmental resistance. In addition, since the imaging lens includes only the spherical lenses, it is possible to easily manufacture the imaging lens, as compared to the imaging lens including the aspheric lenses. As a result, it is possible to reduce apparatus costs.

When the environmental resistance of the imaging lens is increased, the deterioration of the optical performance of the imaging lens caused by the influence of an environment is reduced. For example, when the environmental resistance of the imaging lens is high, the transformation or deformation of the lens member is reduced and the deterioration of the optical performance of the imaging lens is reduced even when the imaging lens is used for a long time or it is provided in a low-temperature environment or a high-temperature and high-humidity environment in a short period of time. In addition, when the environmental resistance of the imaging lens is high, the deterioration of the optical performance of the imaging lens is reduced even when the temperature of the imaging lens varies greatly from room temperature during image capture in a cold region or a tropical region.

BRIEF DESCRIPTION OF THE DRAWINGS

FIGS. 9A to 9D are diagrams illustrating various aberrations of the imaging lens according to Example 1, in which FIG. 9A shows spherical aberration, FIG. 9B shows astigmatism, FIG. 9C shows distortion, and FIG. 9D shows lateral chromatic aberration;

FIGS. 10A to 10D are diagrams illustrating various aberrations of the imaging lens according to Example 2, in which FIG. 10A shows spherical aberration, FIG. 10B shows astigmatism, FIG. 10C shows distortion, and FIG. 10D shows lateral chromatic aberration;

FIGS. 11A to 11D are diagrams illustrating various aberrations of the imaging lens according to Example 3, in which FIG. 11A shows spherical aberration, FIG. 11B shows astigmatism, FIG. 11C shows distortion, and FIG. 11D shows lateral chromatic aberration;

FIGS. 12A to 12D are diagrams illustrating various aberrations of the imaging lens according to Example 4, in which FIG. 12A shows spherical aberration, FIG. 12B shows astigmatism, FIG. 12C shows distortion, and FIG. 12D shows lateral chromatic aberration;

FIGS. 13A to 13D are diagrams illustrating various aberrations of the imaging lens according to Example 5, in which FIG. 13A shows spherical aberration, FIG. 13B shows astigmatism, FIG. 13C shows distortion, and FIG. 13D shows lateral chromatic aberration;

FIGS. 14A to 14D are diagrams illustrating various aberrations of the imaging lens according to Example 6, in which FIG. 14A shows spherical aberration, FIG. 14B shows astigmatism, FIG. 14C shows distortion, and FIG. 14D shows lateral chromatic aberration;

FIGS. 15A to 15D are diagrams illustrating various aberrations of the imaging lens according to Example 7, in which FIG. 15A shows spherical aberration, FIG. 15B shows astigmatism, FIG. 15C shows distortion, and FIG. 15D shows lateral chromatic aberration.

DESCRIPTION OF THE PREFERRED EMBODIMENTS

Hereinafter, an imaging lens and an imaging apparatus using the imaging lens according to exemplary embodiments of the invention will be described in detail with reference to the accompanying drawings.

Figure 1:
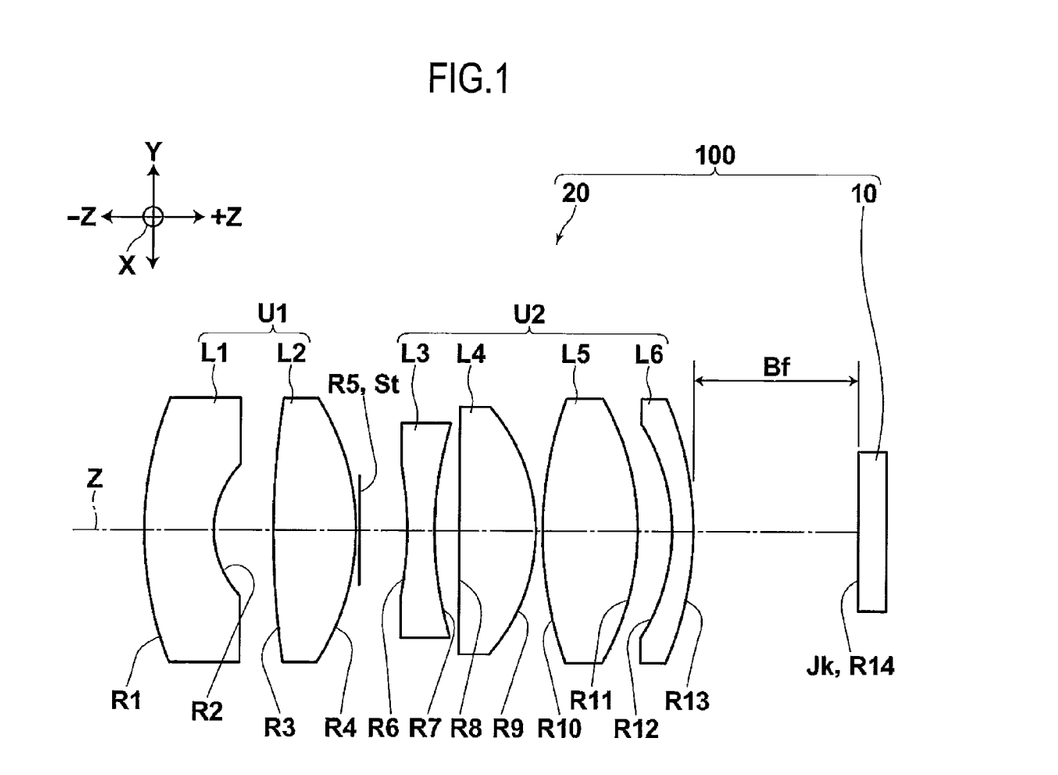
FIG. 1 is a diagram schematically illustrating the structure of an imaging lens according to an embodiment of the invention.
Figure 2:
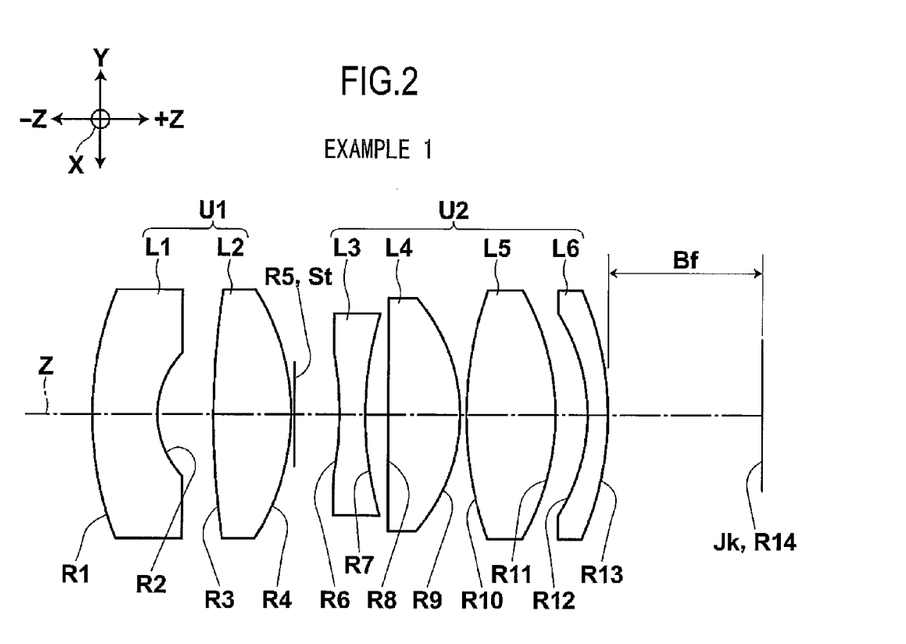
FIG. 2 is a cross-sectional view schematically illustrating the structure of an imaging lens according to Example 1.
Figure 3:
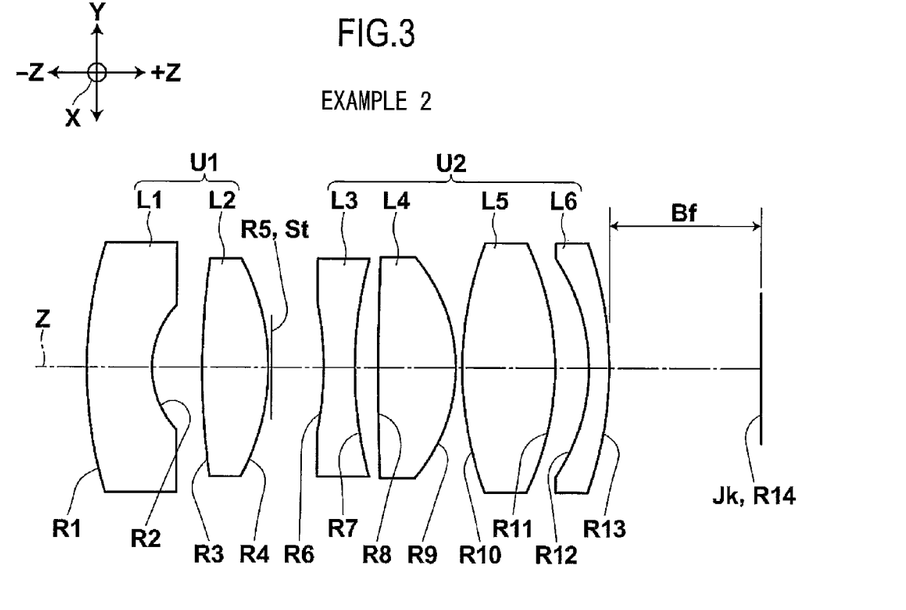
FIG. 3 is a cross-sectional view schematically illustrating the structure of an imaging lens according to Example 2.
Figure 4:
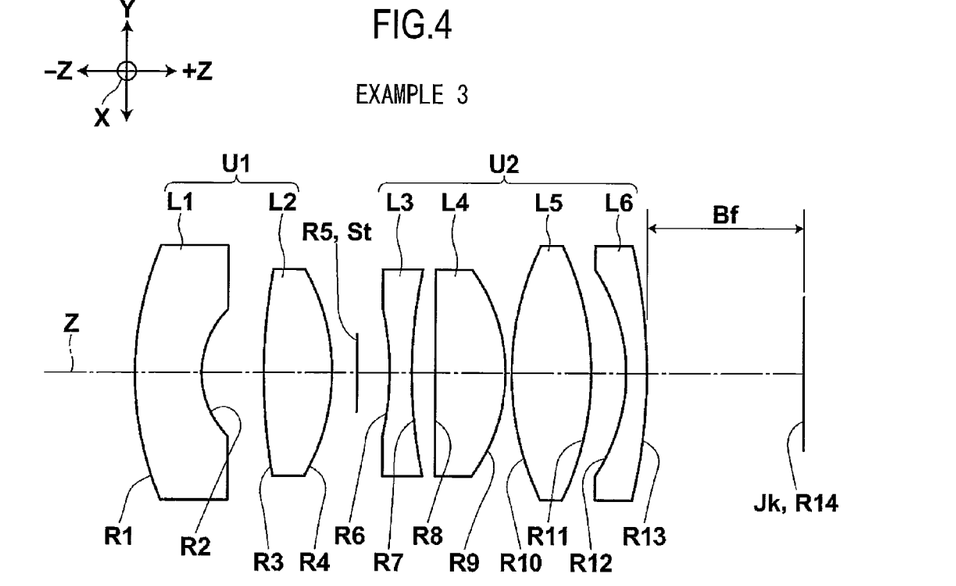
FIG. 4 is a cross-sectional view schematically illustrating the structure of an imaging lens according to Example 3.
Figure 5:
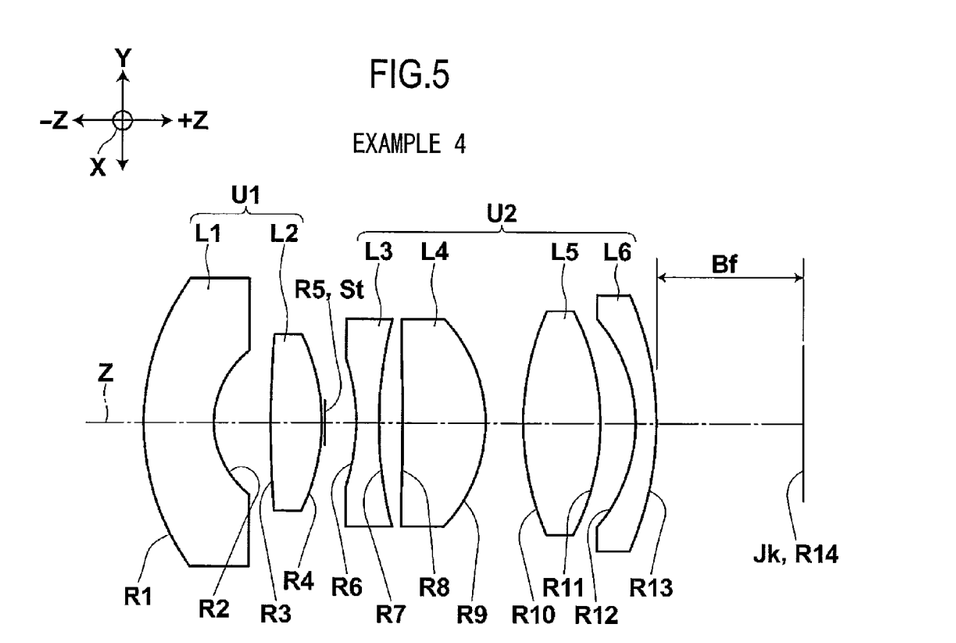
FIG. 5 is a cross-sectional view schematically illustrating the structure of an imaging lens according to Example 4.
Figure 6:
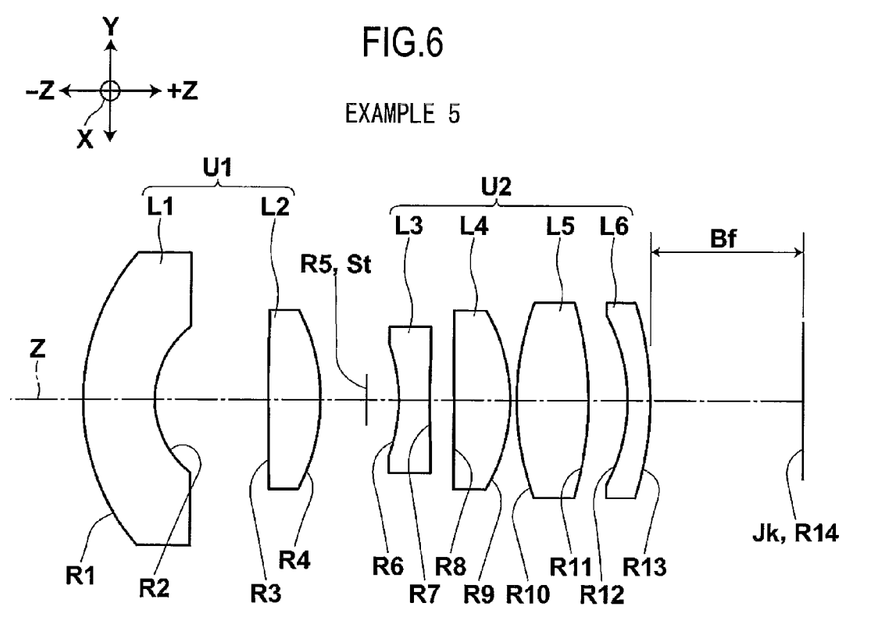
FIG. 6 is a cross-sectional view schematically illustrating the structure of an imaging lens according to Example 5.
Figure 7:
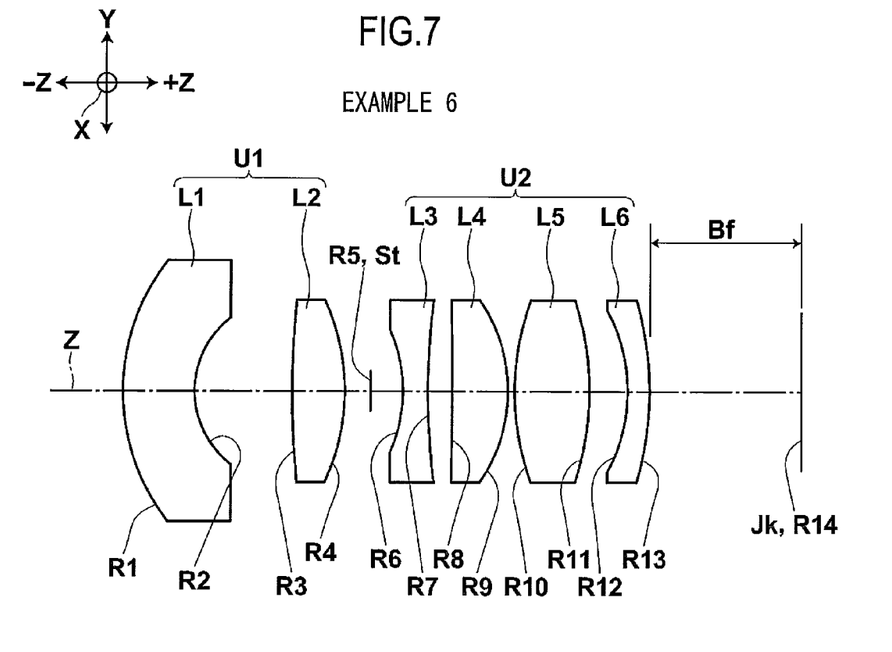
FIG. 7 is a cross-sectional view schematically illustrating the structure of an imaging lens according to Example 6.
Figure 8:
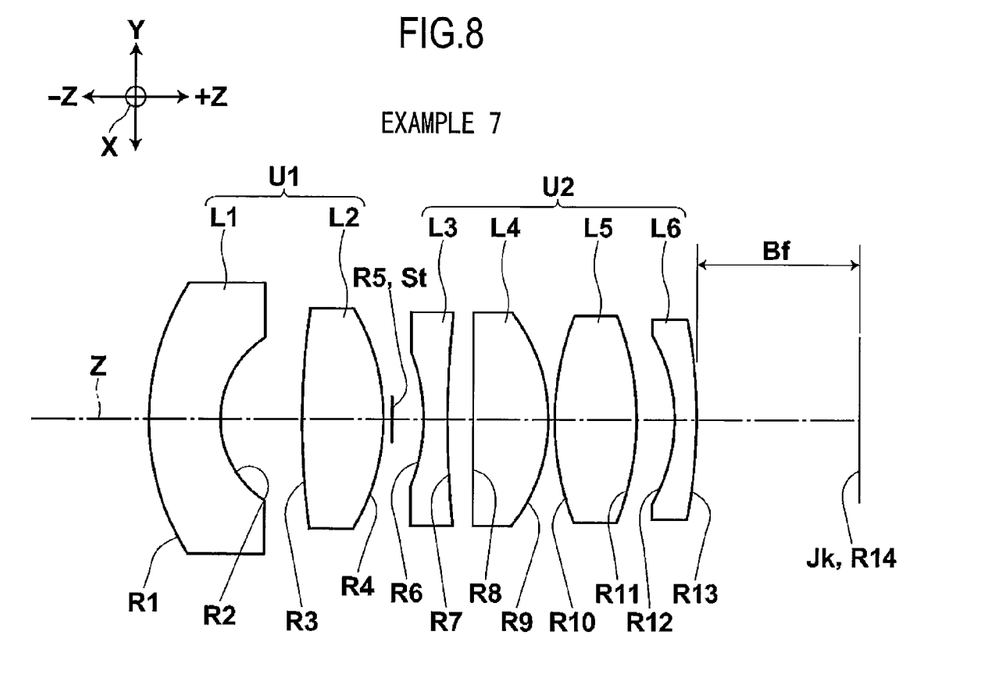
FIG. 8 is a cross-sectional view schematically illustrating the structure of an imaging lens according to Example 7.
Figure 9A:
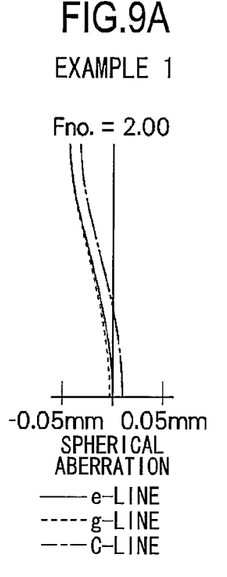
Figure 9B:
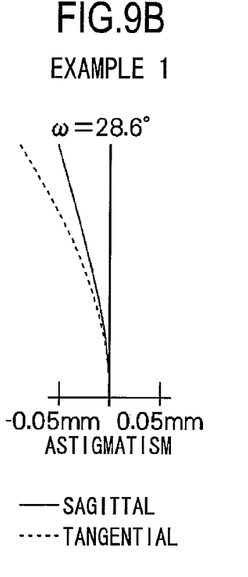
Figures 9C, 9D:
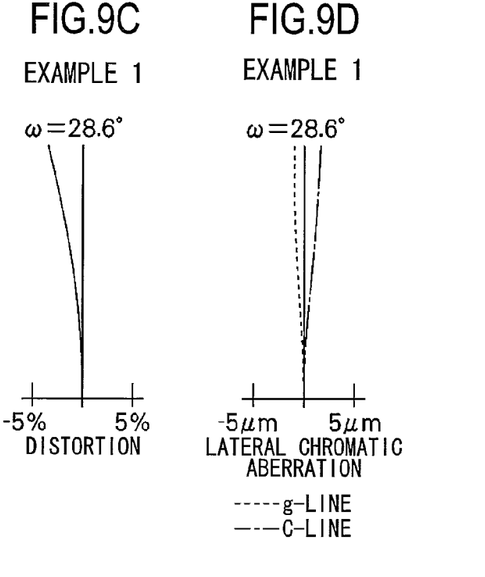
Figure 10A:
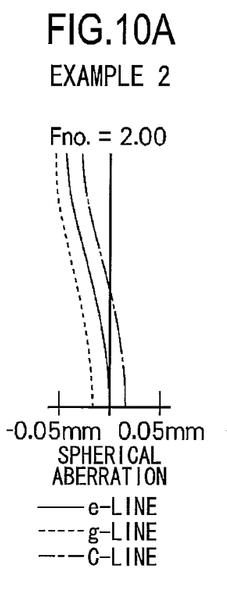
Figure 10B:
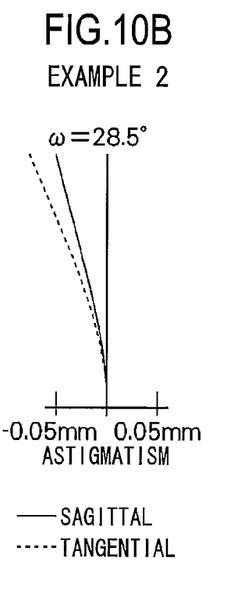
Figures 10C, 10D:
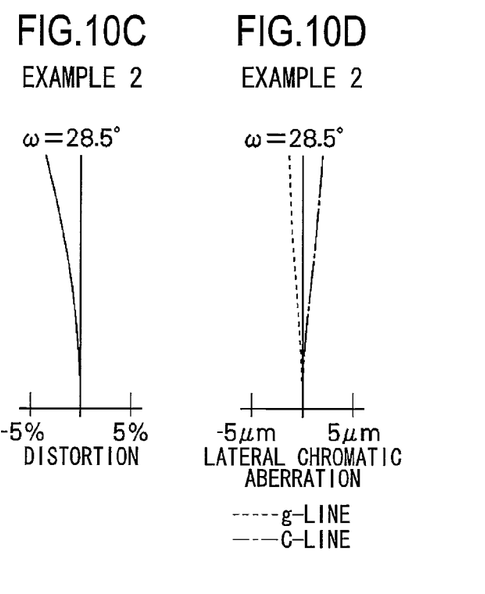
Figure 11A:
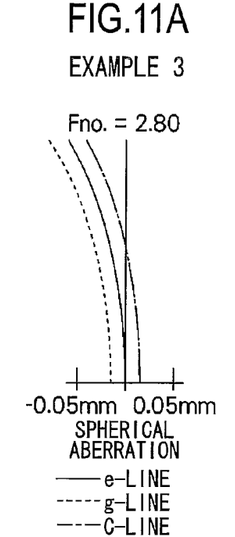
Figure 11B:
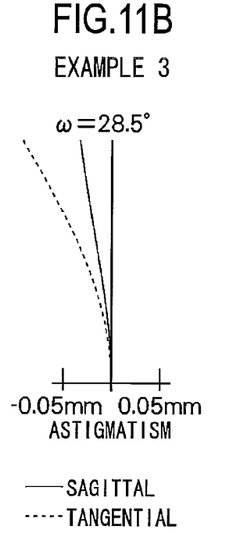
Figure 11C:
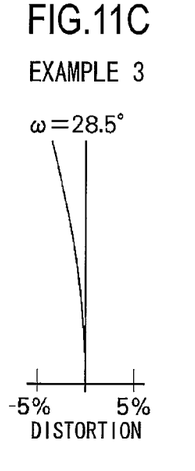
Figure 11D:
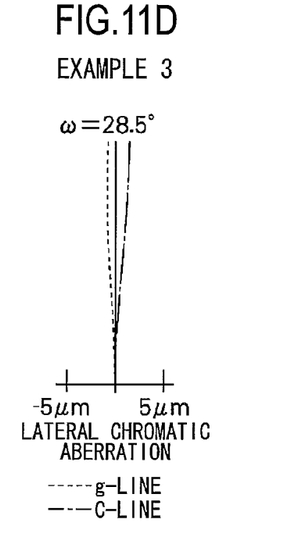
Figure 12A:
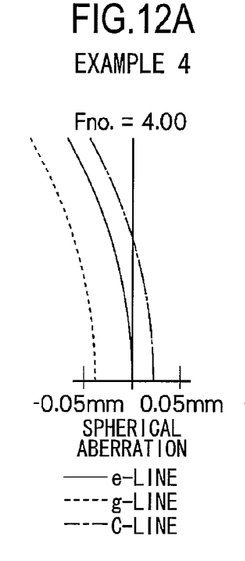
Figure 12B:
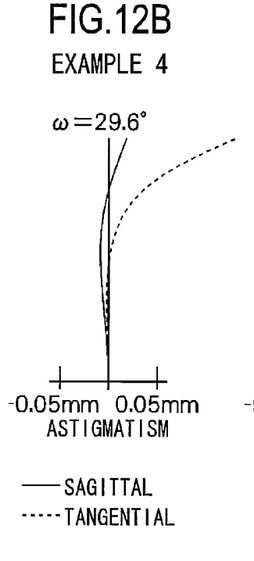
Figure 12C:
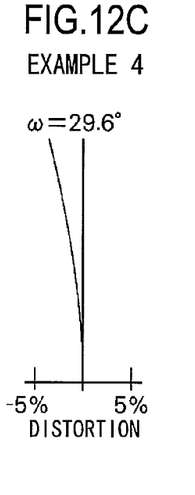
Figure 12D:
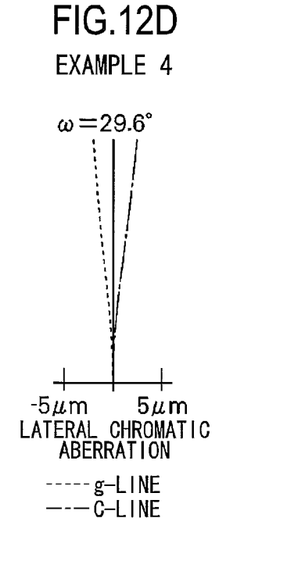
Figure 13A:
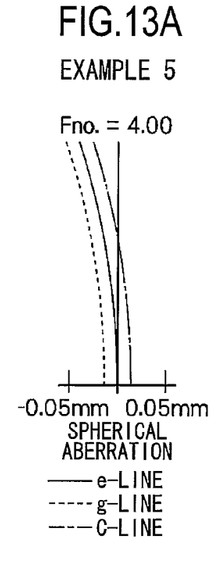
Figure 13B:
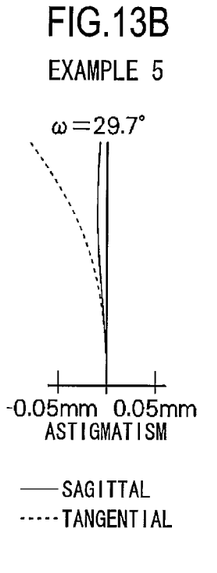
Figure 13C:
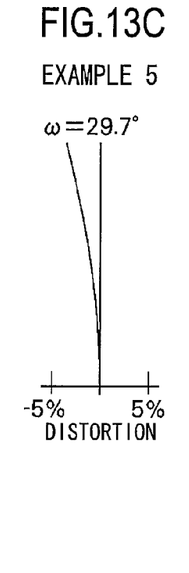
Figure 13D:
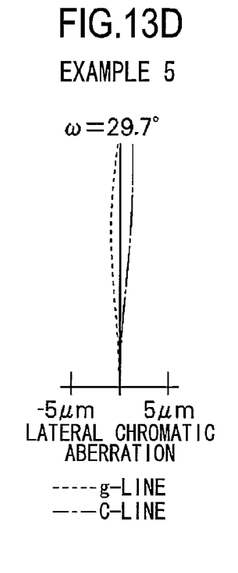
Figure 14A:
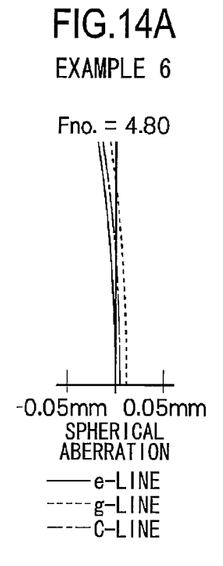
Figure 14B:
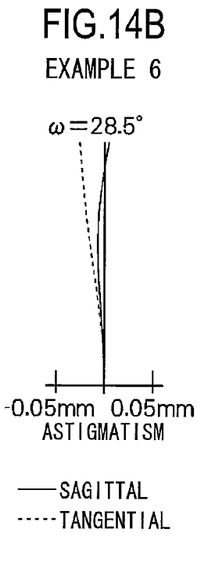
Figure 14C:
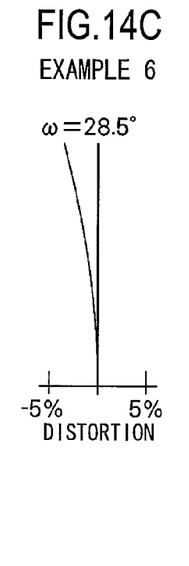
Figure 14D:
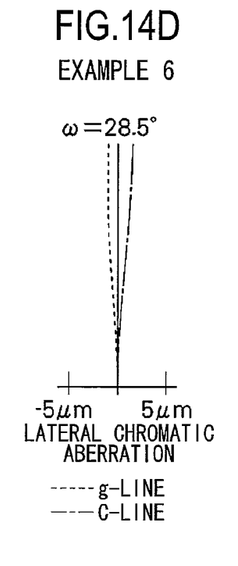
Figure 15A:
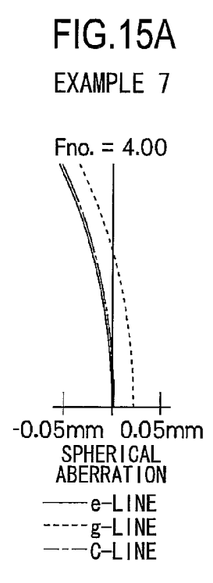
Figure 15B:
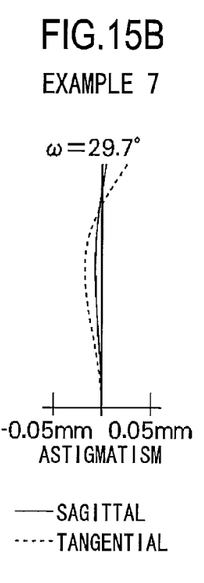
Figure 15C:
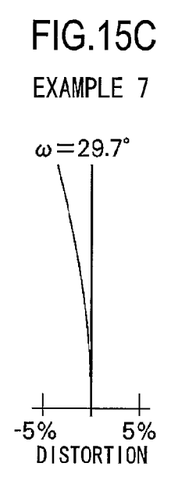
Figure 15D:
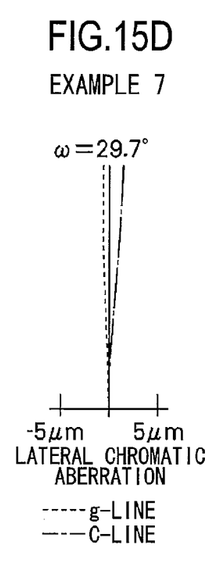

FIG. 1 is a cross-sectional view schematically illustrating the structure of an imaging apparatus using an imaging lens according to an embodiment of the invention.

An imaging lens 20 shown in FIG. 1 is mainly used for an in-vehicle imaging apparatus that captures a situation on the front side of a vehicle, and focuses the image of an object on a light receiving surface Jk of an imaging device 10, such as a CCD or a CMOS. The imaging device 10 converts an optical image formed by the imaging lens 20 into an electric signal to obtain an image signal indicating the optical image.

The imaging lens 20 has an F number of 2.0 to 4.0 and a total angle of view of about 60°. The imaging lens 20 has a small size and a long back focal length and effectively corrects various aberrations.

<Basic Structure, Operation, and Effect of Imaging Lens>

First, the basic structure of the imaging lens 20 will be described.

The imaging lens 20 includes a first lens group U1 having a positive power, an aperture diaphragm, and a second lens group U2 having a positive power arranged in this order from an object side (the side of an arrow −Z in FIG. 1) along an optical axis Z1.

The first lens group U1 includes a first lens L1, which is a meniscus lens having a negative power and including a convex surface facing the object side, and a second lens L2 that has a positive power and includes a convex surface R4 on the image side (the side of an arrow +Z in FIG. 1). The first and second lenses L1 and L2 are arranged in this order from the object side.

The second lens group U2 includes a third lens L3 that has a negative power and includes a concave object-side surface R6, a fourth lens L4 that has a positive power and includes a convex image-side surface R9, a fifth lens L5, which is a biconvex lens, and a sixth lens L6, which is a meniscus lens having a negative power and including a convex surface facing the image side. The third to sixth lenses are arranged in this order from the object side.

Each of the first to sixth lenses L1 to L6 is a single spherical lens made of a glass material.

That is, each of the lenses of the imaging lens 20 is a single spherical glass lens, but is not a cemented lens.

A light receiving surface Jk of the imaging device 10 is provided as an imaging surface R14 on which the image of an object is focused by the imaging lens 20.

In FIG. 1, reference numerals R1 to R14 denote the following components.

That is, R1 and R2 indicate the object-side surface and the image-side surface of the first lens L1, respectively, and R3 and R4 indicate the object-side surface and the image-side surface of the second lens L2, respectively. R5 indicates an aperture of the aperture diaphragm St, and R6 and R7 indicate the object-side surface and the image-side surface of the third lens L3, respectively. R8 and R9 indicate the object-side surface and the image-side surface of the fourth lens L4, respectively, and R10 and R11 indicate the object-side surface and the image-side surface of the fifth lens L5, respectively. R12 and R13 indicate the object-side surface and the image-side surface of the sixth lens L6, respectively, and R14 indicates the imaging surface of the imaging lens 20, which is the light receiving surface Jk of the imaging device 10, as described above.

According to the basic structure of the imaging lens 20, it is possible to obtain an imaging lens having a small size, a long back focal length, and high environmental resistance.

The back focal length (which is represented by Bf in the drawings) is an air equivalent distance from the image-side surface R13 of the sixth lens L6 to the imaging surface R14.

<Structure Further Limiting Basic Structure of Imaging Lens and Operation and Effect Thereof>

Next, components further limiting the basic structure of the imaging lens 20 and the operation and effect thereof will be described. The components further limiting the basic structure of the imaging lens are not necessarily required.

<<Structure for Limiting the Basic Structure Using Conditional Expressions and Operation and Effect Thereof>>

Hereinafter, Conditional expressions 1 to 4 for further limiting the basic structure of the imaging lens and the operation and effect thereof will be described. The imaging lens according to this embodiment may satisfy only one of Conditional expressions 1 to 4, or combinations of two or more of Conditional expressions 1 to 4.

The meaning of each of the parameters represented by symbols in Conditional expressions 1 to 4 will be described below: f indicates the focal length of the entire imaging lens system, that is, the composite focal length of the first lens L1 to the sixth lens L6; f1 indicates the focal length of the first lens; f2 indicates the focal length of the second lens; f36 indicates the focal length of the second lens group U2 (the composite focal length of the third lens to the sixth lens); R11 indicates the curvature radius of the image-side surface of the fifth lens; R12 indicates the curvature radius of the object-side surface of the sixth lens; and vd3 indicates the Abbe number of the third lens with respect to the d-line.

The following Conditional expression 1 relates to the back focal length or field curvature:

$1.1 < f36/f < 1.7.$ [Conditional expression 1]

When the lens system is configured so as to satisfy Conditional expression 1, it is possible to ensure a long back focal length without increasing the total length of the lens system and prevent the occurrence of field curvature.

However, when the lens system is configured such that the value of f36/f is greater than the upper limit of Conditional expression 1, that is, the value of f36/f is equal to or greater than 1.7, it is difficult to ensure a long back focal length without increasing the total length of the lens system.

On the other hand, when the lens system is configured such that the value of f36/f is less than the lower limit of Conditional expression 1, that is, the value of f36/f is equal to or less than 1.1, it is difficult to correct field curvature.

It is more preferable that the value of f36/f satisfy Conditional expression 1' given below:

$1.2 < f36/f < 1.6.$ [Conditional expression 1']

The following Conditional expression 2 relates to astigmatism, comatic aberration, and lateral chromatic aberration:

$-1.4 < f1/f2 < -0.7.$ [Conditional expression 2]

When the lens system is configured so as to satisfy Conditional expression 2, it is possible to effectively correct astigmatism, comatic aberration, and lateral chromatic aberration.

However, when the lens system is configured such that the value of f1/f2 is greater than the upper limit of Conditional expression 2, that is, the value of f1/f2 is equal to or greater than −0.7, it is difficult to correct astigmatism.

When the lens system is configured such that the value of f1/f2 is less than the lower limit of Conditional expression 2, that is, the value of f1/f2 is equal to or less than −1.4, it is difficult to correct comatic aberration and lateral chromatic aberration.

It is more preferable that the value of f1/f2 satisfy Conditional expression 2' given below:

$-1.3 < f1/f2 < -0.8.$ [Conditional expression 2']

The following Conditional expression 3 relates to field curvature or longitudinal chromatic aberration:

$1.1 < R11/R12 < 2.0.$ [Conditional expression 3]

When the lens system is configured so as to satisfy Conditional expression 3, it is possible to effectively correct field curvature or longitudinal chromatic aberration.

However, when the lens system is configured such that the value of R11/R12 is greater than the upper limit of Conditional expression 3, that is, the value of R11/R12 is equal to or greater than 2.0, it is difficult to correct field curvature.

However, when the lens system is configured such that the value of R11/R12 is less than the lower limit of Conditional expression 3, that is, the value of R11/R12 is equal to or less than 1.1, it is difficult to correct longitudinal chromatic aberration.

It is more preferable that the value of R11/R12 satisfy Conditional expression 3' given below:

$1.2 < R11/R12 < 1.9.$ [Conditional expression 3']

The following Conditional expression 4 relates to longitudinal chromatic aberration and lateral chromatic aberration:

$vd3 < 20.$ [Conditional expression 4]

When the lens system is configured so as to satisfy Conditional expression 4, it is possible to effectively correct longitudinal chromatic aberration and lateral chromatic aberration.

However, when the lens system is configured such that the value of vd3 is greater than the upper limit of Conditional expression 4, that is, the Abbe number vd3 of a material forming the third lens L3 with respect to the d-line is equal to or greater than 20, it is difficult to correct longitudinal chromatic aberration and lateral chromatic aberration.

As described above, according to this embodiment of the invention, it is possible to obtain an imaging lens having a small size, a long back focal length, and high environmental resistance.

DETAILED EXAMPLES

Next, numerical data of the imaging lenses according to Examples 1 to 7 of the invention will be described with reference to FIGS. 2 to 15 and Tables 1 to 7. FIGS. 2 to 8 are cross-sectional views schematically illustrating the structures of the imaging lenses according to Examples 1 to 7. In FIGS. 2 to 8, the same reference numerals as those in FIG. 1 denote the corresponding components.

The following Tables 1 to 7 shows basic data of the imaging lenses according to Examples 1 to 7. In each of the tables, an upper part shows lens data of the imaging lenses (which is represented by (a) in the drawings) and a lower part shows the brief specifications of the imaging lenses (which is represented by (b) in the drawings).

TABLE 1

EXAMPLE 1
(a)
LENS DATA

| SURFACE NUMBER | Ri | di | Ndj | vdj |
|---|---|---|---|---|
| 1 | 10.78 | 2.10 | 1.77250 | 49.6 |
| 2 | 2.891 | 1.80 | | |
| 3 | 26.77 | 2.50 | 2.00330 | 28.3 |
| 4 | −7.428 | 0.10 | | |
| 5 (St) | | 1.45 | | |
| 6 | −10.71 | 0.81 | 1.92286 | 18.9 |
| 7 | 11.19 | 0.75 | | |

TABLE 1-continued

| 8 | ∞ | 2.31 | 1.74100 | 52.6 |
|---|---|---|---|---|
| 9 | −5.705 | 0.20 | | |
| 10 | 11.75 | 2.89 | 1.72916 | 54.7 |
| 11 | −8.062 | 1.04 | | |
| 12 | −6.052 | 0.65 | 1.92286 | 18.9 |
| 13 | −10.02 | 4.95 | | |
| 14 | ∞ | | | |

(b)
BRIEF SPECIFICATIONS

| f | 4.74 |
|---|---|
| Fno | 2.00 |
| 2ω | 57.1 |
| fЗ6 | 6.94 |
| f1 | −5.78 |
| f2 | 6.02 |
| f36/f | 1.46 |
| f1/f2 | −0.96 |
| R11/R12 | 1.33 |
| vd3 | 18.9 |

TABLE 2

EXAMPLE 2
(a)
LENS DATA

| SURFACE NUMBER | Ri | di | Ndj | vdj |
|---|---|---|---|---|
| 1 | 13.56 | 2.10 | 1.72916 | 54.7 |
| 2 | 2.962 | 1.60 | | |
| 3 | 24.33 | 2.13 | 2.00069 | 25.5 |
| 4 | −7.467 | 0.10 | | |
| 5 (St) | | 1.68 | | |
| 6 | −10.74 | 0.99 | 2.14352 | 17.8 |
| 7 | 13.54 | 0.75 | | |
| 8 | 97.30 | 2.50 | 1.75500 | 52.3 |
| 9 | −5.444 | 0.20 | | |
| 10 | 11.13 | 3.00 | 1.75500 | 52.3 |
| 11 | −9.256 | 1.09 | | |
| 12 | −6.265 | 0.65 | 1.84666 | 23.8 |
| 13 | −11.89 | 4.85 | | |
| 14 | ∞ | | | |

(b)
BRIEF SPECIFICATIONS

| f | 4.74 |
|---|---|
| Fno | 2.00 |
| 2ω | 57.1 |
| f36 | 6.63 |
| f1 | −5.67 |
| f2 | 5.91 |
| f36/f | 1.40 |
| f1/f2 | −0.96 |
| R11/R12 | 1.48 |
| vd3 | 17.8 |

TABLE 3

EXAMPLE 3
(a)
LENS DATA

| SURFACE NUMBER | Ri | di | Ndj | vdj |
|---|---|---|---|---|
| 1 | 10.24 | 2.10 | 1.90366 | 31.3 |
| 2 | 2.841 | 1.95 | | |
| 3 | 18.38 | 2.15 | 1.84666 | 23.8 |
| 4 | −6.547 | 0.78 | | |
| 5 (St) | | 1.02 | | |
| 6 | −9.186 | 0.70 | 1.92286 | 18.9 |
| 7 | 15.73 | 0.75 | | |
| 8 | 0.000 | 2.20 | 1.71300 | 53.9 |

TABLE 3-continued

| | | | | |
|---|---|---|---|---|
| 9 | −5.530 | 0.20 | | |
| 10 | 9.193 | 2.52 | 1.78800 | 47.4 |
| 11 | −9.193 | 1.09 | | |
| 12 | −5.876 | 0.65 | 1.92286 | 18.9 |
| 13 | −17.48 | 4.93 | | |
| 14 | ∞ | | | |

(b)
BRIEF SPECIFICATIONS

| | |
|---|---|
| f | 4.75 |
| Fno | 2.80 |
| 2ω | 57.1 |
| f36 | 7.44 |
| f1 | −5.03 |
| f2 | 5.94 |
| f36/f | 1.57 |
| f1/f2 | −0.85 |
| R11/R12 | 1.56 |
| vd3 | 18.9 |

TABLE 4

EXAMPLE 4
(a)
LENS DATA

| SURFACE NUMBER | Ri | di | Ndj | vdj |
|---|---|---|---|---|
| 1 | 7.661 | 2.20 | 1.88300 | 40.8 |
| 2 | 2.841 | 1.78 | | |
| 3 | 34.09 | 1.60 | 1.92286 | 18.9 |
| 4 | −6.352 | 0.10 | | |
| 5 (St) | | 0.98 | | |
| 6 | −6.298 | 0.70 | 1.92286 | 18.9 |
| 7 | 12.83 | 0.75 | | |
| 8 | −59.80 | 2.59 | 1.71300 | 53.9 |
| 9 | −4.704 | 1.19 | | |
| 10 | 8.701 | 2.42 | 1.75500 | 52.3 |
| 11 | −7.660 | 1.10 | | |
| 12 | −4.999 | 0.65 | 1.92286 | 18.9 |
| 13 | −10.00 | 4.59 | | |
| 14 | ∞ | | | |

(b)
BRIEF SPECIFICATIONS

| | |
|---|---|
| f | 4.54 |
| Fno | 4.00 |
| 2ω | 59.3 |
| f36 | 5.77 |
| f1 | −6.51 |
| f2 | 5.91 |
| f36/f | 1.27 |
| f1/f2 | −1.10 |
| R11/R12 | 1.53 |
| vd3 | 18.9 |

TABLE 5

EXAMPLE 5
(a)
LENS DATA

| SURFACE NUMBER | Ri | di | Ndj | vdj |
|---|---|---|---|---|
| 1 | 6.890 | 2.20 | 1.90366 | 31.3 |
| 2 | 2.841 | 3.49 | | |
| 3 | 132.4 | 1.60 | 1.84666 | 23.8 |
| 4 | −5.986 | 1.40 | | |
| 5 (St) | | 1.00 | | |
| 6 | −5.038 | 0.95 | 1.92286 | 18.9 |
| 7 | 32.78 | 0.75 | | |
| 8 | −243.3 | 1.74 | 1.75500 | 52.3 |
| 9 | −5.319 | 0.20 | | |

TABLE 5-continued

| | | | | |
|---|---|---|---|---|
| 10 | 8.582 | 2.22 | 1.78800 | 47.4 |
| 11 | −10.42 | 1.19 | | |
| 12 | −5.612 | 0.70 | 1.92286 | 18.9 |
| 13 | −10.00 | 4.69 | | |
| 14 | ∞ | | | |

(b)
BRIEF SPECIFICATIONS

| | |
|---|---|
| f | 4.53 |
| Fno | 4.00 |
| 2ω | 59.4 |
| f36 | 6.79 |
| f1 | −7.21 |
| f2 | 6.80 |
| f36/f | 1.50 |
| f1/f2 | −1.06 |
| R11/R12 | 1.86 |
| vd3 | 18.9 |

TABLE 6

EXAMPLE 6
(a)
LENS DATA

| SURFACE NUMBER | Ri | di | Ndj | vdj |
|---|---|---|---|---|
| 1 | 6.494 | 2.20 | 1.90366 | 31.3 |
| 2 | 2.841 | 3.00 | | |
| 3 | 27.86 | 1.60 | 1.84666 | 23.8 |
| 4 | −6.718 | 0.79 | | |
| 5 (St) | | 1.00 | | |
| 6 | −4.568 | 0.76 | 1.92286 | 18.9 |
| 7 | 21.72 | 0.75 | | |
| 8 | −129.4 | 1.73 | 1.75500 | 52.3 |
| 9 | −4.864 | 0.20 | | |
| 10 | 8.187 | 2.30 | 1.78800 | 47.4 |
| 11 | −9.087 | 1.17 | | |
| 12 | −5.207 | 0.66 | 1.92286 | 18.9 |
| 13 | −10.00 | 4.65 | | |
| 14 | ∞ | | | |

(b)
BRIEF SPECIFICATIONS

| | |
|---|---|
| f | 4.74 |
| Fno | 4.80 |
| 2ω | 57.1 |
| f36 | 6.60 |
| f1 | −7.83 |
| f2 | 6.53 |
| f36/f | 1.39 |
| f1/f2 | −1.20 |
| R11/R12 | 1.75 |
| vd3 | 18.9 |

TABLE 7

EXAMPLE 7
(a)
LENS DATA

| SURFACE NUMBER | Ri | di | Ndj | vdj |
|---|---|---|---|---|
| 1 | 7.473 | 2.10 | 1.90366 | 31.3 |
| 2 | 2.859 | 2.40 | | |
| 3 | 23.61 | 2.39 | 1.84666 | 23.8 |
| 4 | −6.424 | 0.25 | | |
| 5 (St) | | 0.94 | | |
| 6 | −5.257 | 0.70 | 1.92286 | 18.9 |
| 7 | 30.52 | 0.75 | | |
| 8 | 0.000 | 2.22 | 1.71300 | 53.9 |
| 9 | −5.106 | 0.20 | | |
| 10 | 8.422 | 2.40 | 1.78800 | 47.4 |

TABLE 7-continued

| 11 | −8.422 | 1.12 | | |
|---|---|---|---|---|
| 12 | −4.998 | 0.65 | 1.92286 | 18.9 |
| 13 | −15.48 | 4.79 | | |
| 14 | ∞ | | | |

(b)
BRIEF SPECIFICATIONS

| f | 4.74 |
|---|---|
| Fno | 4.79 |
| 2ω | 57.1 |
| f36 | 7.48 |
| f1 | −6.54 |
| f2 | 6.19 |
| f36/f | 1.58 |
| f1/f2 | −1.06 |
| R11/R12 | 1.68 |
| νd3 | 18.9 |

In the upper part in the lens data shown in Tables 1 to 7, the surface number of an optical member, such as a lens, from the object side is represented by an i-th (i=1 to 14) surface number, and the surface number is sequentially increased toward the image side. In addition, the lens data includes the surface number (i=5) of the aperture diaphragm St and the surface number (i=14) of the imaging surface.

Ri indicates the curvature radius of the i-th(i=1, 2, 3, ... ) surface, and Di indicates the surface spacing between the i-th (i=1, 2, 3, ... ) surface and an (i+1)-th surface on the optical axis Z1. In the lens data, Ri corresponds to Ri (i=1, 2, 3, ... ) indicating the lens surface in FIG. 1.

In addition, in the lens data, Ndj indicates the refractive index of a j-th (j=1, 2, 3, ... ) optical component from the object side with respect to the d-line (wavelength: 587.6 nm). The number of the optical component is sequentially increased toward the image side.

In addition, vdj indicates the Abbe number of the j-th optical component with respect to the d-line.

The units of the curvature radius and the surface spacing are millimeters (mm). When the lens surface is convex toward the object side, the curvature radius thereof has a positive value. When the lens surface is convex toward the image side, the curvature radius thereof has a negative value.

The symbols of each item in the brief specifications shown in the lower part of each of Tables 1 to 7 correspond to the following content. Some of the following symbols have already been described above.

That is, the brief specifications of the following items are shown in Tables 1 to 7: f indicates the focal length of the entire imaging lens system (the composite focal length of the first lens to the sixth lens); Fno indicates the F number; 2ω indicates a total angle of view; f36 indicates the focal length of the second lens group U2 including the third lens, the fourth lens, the fifth lens, and the sixth lens; R11 indicates the curvature radius of the image-side surface of the fifth lens, R12 indicates the curvature radius of the object-side surface of the sixth lens; f1 indicates the focal length of the first lens, f2 indicates the focal length of the second lens; and vd3 indicates the Abbe number of the third lens with respect to the d-line.

FIGS. 9 to 15 are diagrams illustrating all aberration of the imaging lenses according to Examples 1 to 7. FIGS. 9 to 15 show the aberrations of the imaging lenses according to Examples 1 to 7 with respect to the e-line (wavelength: 546.1 nm), the g-line (wavelength: 435.8 nm), and the C-line (wavelength: 656.3 nm).

The distortion diagram shows the amount of deviation from an ideal image height f×tan θ when the focal length of the entire lens system is f and an angle of view is θ (a variable, $0 \leq \theta \leq \omega$).

As can be seen from the basic data of Examples 1 to 7 and the diagrams illustrating various aberrations, according to the imaging lens of the invention, it is possible to optimize the shape and material of each of the six lenses. Therefore, it is possible to obtain an imaging lens having a small size, a long back focal length, and high environmental resistance.

Although the embodiment and the examples of the invention have been described above, the invention is not limited to the embodiment and the examples, but various modifications and changes of the invention can be made. For example, the curvature radius, surface spacing, and refractive index of each lens component are not limited to the values shown in the drawings, but each lens component may have other values.

Figure 16:
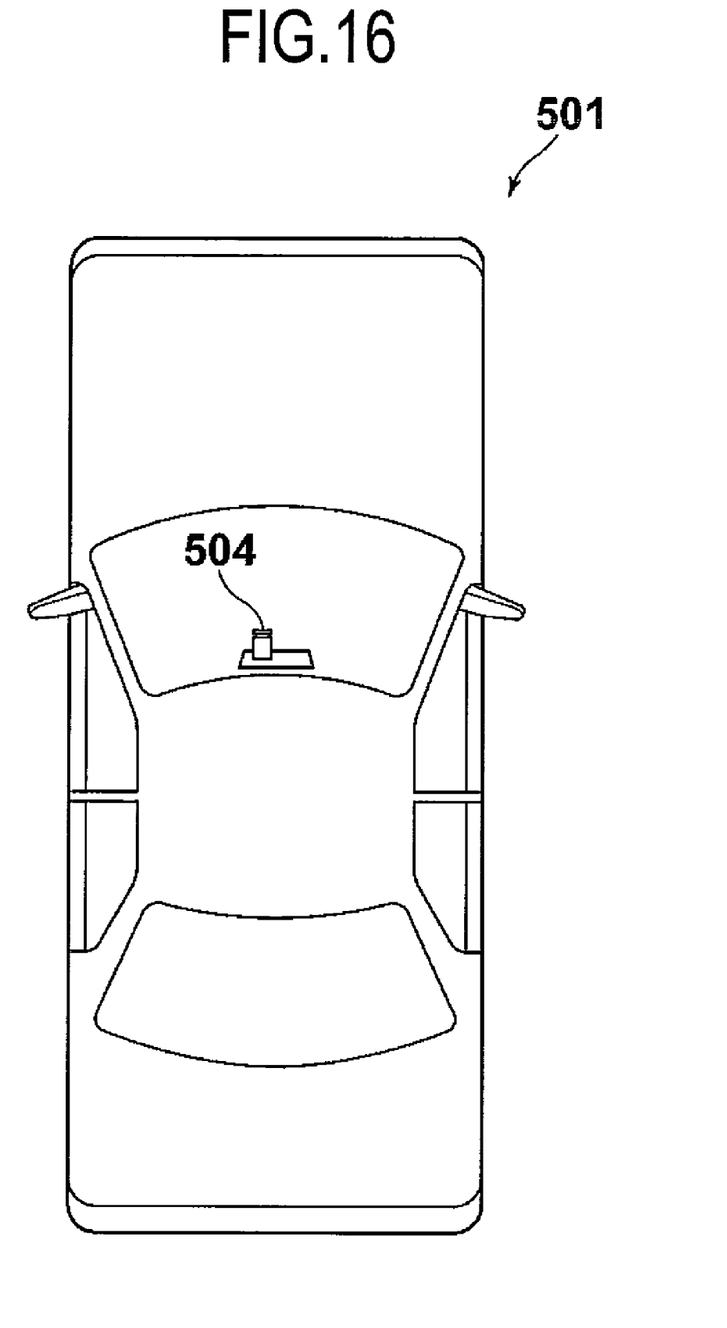
FIG. 16 is a diagram illustrating a vehicle provided with an in-vehicle camera, which is an imaging apparatus using the imaging lens according to the invention.

FIG. 16 is a diagram illustrating a vehicle provided with an in-vehicle camera, which is an example of an imaging apparatus according to the invention that includes the imaging lens according to the invention and an imaging device converting the optical image formed by the imaging lens into an electric signal.

As shown in FIG. 16, an in-vehicle camera 504 using the imaging lens according to the invention is mounted to the rear surface of a room mirror of a vehicle 501 and captures the front view of the vehicle 501. When the vehicle 501 is travelling, the in-vehicle camera 504 captures the front view to monitor the deviation of the vehicle 501 from its lane, to monitor traffic signs, or to monitor whether there is an obstacle in the course.

What is claimed is:

1. An imaging lens consisting of:
a first lens group having a positive power;
a stop; and
a second lens group having a positive power,
wherein the first lens group, the stop, and the second lens group are arranged in this order from an object side,
the first lens group includes, in order from the object side,
a first lens, which is a meniscus lens having a negative power and including a convex surface facing the object side, and
a second lens that has a positive power and includes a convex image-side surface,
the second lens group includes, in order from the object side,
a third lens that has a negative power and includes a concave object-side surface,
a fourth lens that has a positive power and includes a convex image-side surface,
a fifth lens, which is a biconvex lens, and
a sixth lens, which is a meniscus lens having a negative power and including a convex surface facing an image side, and
each of the first to sixth lenses is a single spherical glass lens.

2. The imaging lens according to claim 1, wherein the imaging lens satisfies the following conditional expression:

$$1.1 < f36/f < 1.7$$

where f indicates a focal length of an entire imaging lens system, and f36 indicates a focal length of the second lens group.

3. The imaging lens according to claim 1,
wherein the imaging lens satisfies the following conditional expression:

$$-1.4 < f1/f2 < -0.7$$

where f1 indicates a focal length of the first lens and f2 indicates a focal length of the second lens.

4. The imaging lens according to claim 1,
wherein the imaging lens satisfies the following conditional expression:

$$1.1 < R11/R12 < 2.0$$

where R11 indicates a curvature radius of an image-side surface of the fifth lens, and R12 indicates a curvature radius of an object-side surface of the sixth lens.

5. The imaging lens according to claim 1,
wherein the imaging lens satisfies the following conditional expression:

$$vd3 < 20$$

where vd3 indicates the Abbe number of the third lens at the d-line.

6. An imaging apparatus comprising:
the imaging lens according to claim 1; and
an imaging device that converts an optical image formed by the imaging lens into an electric signal.

* * * * *